United States Patent [19]

Willis

[11] Patent Number: 4,480,075
[45] Date of Patent: Oct. 30, 1984

[54] BLOCK COPOLYMERS OF ZIEGLER-NATTA POLYMERIZED AND ANIONICALLY POLYMERIZED MONOMERS

[75] Inventor: Carl L. Willis, Houston, Tex.
[73] Assignee: Shell Oil Company, Houston, Tex.
[21] Appl. No.: 507,382
[22] Filed: Jun. 24, 1983
[51] Int. Cl.³ .................... C08F 297/04; C08F 297/06
[52] U.S. Cl. .................................. 525/247; 525/250; 525/266; 525/268; 525/314; 525/323; 525/324
[58] Field of Search ............... 525/268, 250, 314, 247, 525/266

[56] References Cited

U.S. PATENT DOCUMENTS

| | | | |
|---|---|---|---|
| 3,231,635 | 1/1966 | Holden et al. | 525/271 |
| 3,632,678 | 1/1972 | Ehrig et al. | 525/250 |
| 3,739,042 | 6/1973 | Chu et al. | 525/279 |
| 3,851,015 | 11/1974 | Agouri et al. | 525/251 |
| 3,949,016 | 4/1976 | Agouri et al. | 525/94 |

FOREIGN PATENT DOCUMENTS 46-32412  9/1971  Japan .................................. 525/268
6007443  10/1966  South Africa .

OTHER PUBLICATIONS

P. Cohen, J. J. M. Abadie, F. Schue and D. H. Richards, "Block Copolymers Synthesis via Anionic to Ziegler–Natta Transformation Reaction", Oct. 1981, pp. 1316–1319, *Polymer Communications*.

D. H. Richards, "Catalyst Systems", Sep. 1980, *The British Polymer Journal*, vol. 12.

*Primary Examiner*—Wilbert J. Briggs, Sr.
*Attorney, Agent, or Firm*—Peter A. Bielinski

[57] ABSTRACT

Block copolymers are prepared by using two successive and different catalytic processes, a Ziegler-Natta type polymerization followed by a conventional anionic polymerization.

34 Claims, No Drawings

BLOCK COPOLYMERS OF ZIEGLER-NATTA POLYMERIZED AND ANIONICALLY POLYMERIZED MONOMERS

FIELD OF THE INVENTION

This invention relates to a method of making block copolymers. More particularly, this invention relates a method for making block copolymers comprising polymerizing a first block using a Ziegler-Natta polymerization mechanism, transferring said first block to an anionic polymerization initiator and polymerizing subsequent blocks using a conventional anionic polymerization mechanism and the block copolymers produced thereby.

BACKGROUND OF THE INVENTION

Anionic polymerization is widely used for the synthesis of block copolymers. Anionic systems are generally attractive for a variety of reasons. Products have a predictable molecular weight equal to the grams of monomer divided by the moles of initiator, and a narrow molecular weight distribution with high purity block compositions. Facile and efficient paths are available for coupling of living segments into linear, branched, or star-shaped species or, a second anionically polymerized block might be polymerized to afford an ABC three block copolymer. Also efficient end-of chain functional capping is possible with reagents such as $RCOR$, $O=S(=O)_2$, epoxide, $CO_2$, $SO_3$, $O_2$, bisphenol-A type epoxide, $SiCl_4$, $Si(OR)_4$, epoxide etc. However only activated olefins such as styrene monomer, butadiene, isoprene, methylmethacrylate, etc., are susceptible to this mode of polymerization. It is well known in the art that alkyl lithium reagents will not readily catalyze the polymerization of relatively inexpensive ethylene propylene, or butylene monomers.

Ziegler-Natta polymerization is an important mechanism for the polymerization of olefins. Ziegler-Natta catalytic systems are defined as a combination of metal alkyls of groups I to III with transition metal salts of groups IV to VIII. This method is effective in polymerzing a wide range of olefin monomers including ethylene propylene, 1-butene, and mixtures thereof It is also well known that in the catalytic polymerization of alpha olefinic hydrocarbons such as propylene or butene, it is possible to produce polymers having widely different properties and physical characteristics depending, to a large extent, upon the catalyst system and the process conditions. Much of the work in this field has been directed to the development of catalysts and catalytic processes that are capable of forming highly crystalline polymers, of at least 70% crystallinity, since it has been shown that these highly crystalline polymers have greatly improved properties over the completely or predominantly amorphous polymers. It is apparent therefore, that processes that will form highly crystalline polymers are of considerable importance in the art. Ziegler-Natta catalysis has been found to produce highly isotactic homopolymers which have an increased crystallinity and a higher melt temperature. Also block copolymers containing isotactic or crystalline blocks will have higher service temperatures than their atactic amorphous analogs.

Ziegler-Natta catalysts have also been employed in the copolymerization of ethylene, propylene, and/or 1-butene. Inexpensive elastomers are produced in this way. Block copolymers having inexpensive rubber segments would enjoy cost advantage over analogous materials based upon butadiene or isoprene.

Since the inception of Ziegler-Natta catalysis numerous researchers have attempted to use this polymerization technique to synthesize either sequential olefin-olefin or olefin-vinyl block copolymers in cases in which the polar monomer is compatible with such catalysts. In spite of considerable work in the area it has not been possible to synthesize such block copolymers. Sequential copolymers of the olefin type that can be obtained through the Ziegler-Natta catalysis are swamped with large amounts of corresponding homopolymers. This difficulty stems from the fact that in Ziegler-Natta catalysis the average life of nascent chains is very short, which is primarily due to transfer reactions. The larger the number of blocks desired the more difficult it is to obtain a selected polyolefin block copolymer. The precise segmented structure which can be obtained with the long-lived anionic systems is simply not possible with the Ziegler-Natta catalysts.

New approaches have been developed in recent years for the synthesis of block copolymers involving novel combinations of monomers resulting in novel properties. These have required various transformation reactions to enable the mode of polymerization employed for the first polymer to be switched to a different mode most suitable for polymerizing the second monomer. Such processes may require an intermediate stage where the initial homopolymer is isolated before introducing it into an environment appropriate to the polymerization of the second monomer. Examples have been published of the following transformation reactions: Anion to cation, anion to free radical, cation to anion, anion to Ziegler-Natta catalysis and recently Ziegler-Natta catalysis to free radical catalysis.

The Ziegler-Natta to free radical scheme consists of polymerizing olefin in the presence of Ziegler-Natta catalysts and a third organometallic compound usually diethylzinc or diethyl cadmium then activating these terminal metal-carbon bonds with a cocatalyst such as oxygen, peroxide, etc. which gives rise to free radicals and initiates polymerization of the vinyl monomers. This process, however, is complicated by the formation of graft and homopolymers.

Agouri et al in U.S. Pat. Nos. 3,851,015 and 3,949,016 used this technique for preparing bi-sequenced copolymers of the polyolefin-polyvinyl type which contained both a crystalline and an amorphous sequence.

In a first phase Agouri polymerized an olefin using a conventional Ziegler-Natta system in the presence of diethylzinc which is a very effective transfer agent for this type of polymerization. The second sequencing phase consisted of using an oxidizing agent to activate the zinc-carbon bond located on the polymer so as to initiate the free radical polymerization.

Ziegler-Natta catalysis is capable of producing highly isotactic therefore highly crystalline polymers and in addition can polymerize a wide range of monomers including ethylene and propylene. Zielger-Natta catalysis however results in polymers with very short life times making sequential polymerization difficult or impossible. A method was sought therefore that could render the Ziegler-Natta polymer products living. The process of the present invention requires a transfer from a Ziegler-Natta catalyst to an anionic polymerization initiator. This Ziegler-Natta to anionic route attaches the second block via a living polymerization reaction. This living polymer scheme allows further reaction of the di-block polymer such as end capping, coupling, polymerization of a third or further block or grafting. In addition, the transfer reactions are accomplished by straight forward irreversible chemistry. Block copolymers yield is very high due to the absence of side reactions and/or unfavorable equilibria. This route allows, for the first time, the direct synthesis of elastomers of isoprene which may be hydrogenated to a copolymer of ethylene-propylene or butadiene which may be hydrogenated to a copolymer of ethylene-butylene with crystalline, Ziegler-Natta (Z-N) endblocks of propylene, 1-butene or ethylene.

OBJECTS OF THE INVENTION

Accordingly, it is an object of this invention to provide a novel process for the preparation of block copolymers prepared from readily obtainable inexpensive monomers such as ethylene propylene, and 1-butene Another object of this invention is to provide a novel process for the preparation of block copolymers which contain blocks having a relatively high crystallinity.

A further object of this invention is to provide a process by which polymers produced by Ziegler-Natta catalysis can be rendered living and therefore susceptible to further polymerization.

SUMMARY OF THE INVENTION

The present invention broadly includes a process for preparing living multi-block copolymers comprising:
(a) combining under polymerization conditions one or more alpha olefin monomers in a suitable diluent in the presence of a Ziegler-Natta catalyst system and a transmetallation reagent selected from the group consisting of dialkyl zinc, dialkyl cadmium, tetralkyl lead, and their salts,
(b) contacting the resulting polymer with an anionic transfer reagent generating an anionic polymerization initiator thereby forming living polymer chains,
(c) contacting the resulting living polymer chains sequentially with one or more monomers selected from the group consisting of conjugated dienes, and monoalkenylarenes and activated mono olefins;
(d) recovering multi-block copolymers.
and also a process for preparing block copolymers comprising:
(a) combining under polymerization conditions one or more alpha-olefin, monomers, a Ziegler-Natta catalyst, a transmetallation reagent in a suitable diluent;
(b) contacting the resulting polymer with a lithium alkoxide anionic polymerization transfer reagent, for example, MeOLi, EtOLi, PrOLi, BuOLi, hexyl and octyl alkoxides of lithium, thereby forming living polymer chains;
(c) contacting the resulting living polymer chains sequentially with one or more monomers selected from the groups consisting conjugated dienes monoalkenylarenes and activated monoolefins thereby forming living multi block copolymers;
(d) contacting the resulting living multi block copolymers with a coupling agent having a functionality of two or more; and
(e) recovering the resulting block copolymer.

The block copolymers according to the present invention exhibit a higher service temperature due to highly crystalline endblocks and can be prepared using ethylene propylene, and 1-butene monomers.

DETAILED DESCRIPTION OF THE INVENTION

ZIEGLER-NATTA POLYMERIZATION STEP

Monomers

The Ziegler-Natta catalyzed portion of the block copolymer may comprise any monomers which will polymerize with titanium based catalyst systems. Preferred monomers are aliphatic alpha-monoolefins (1-monoolefins) polymerizable with titanium-based catalyst systems. These aliphatic 1-monoolefins can be represented by $RCH=CH_2$ in which R is hydrogen or an alkyl radical. It is presently preferred to employ the 1-monoolefins of 2 to 8 carbon atoms per molecule, though 1-monoolefins of greater numbers of carbon atoms also can be polymerized in accordance with my process.

Exemplary 1-monoolefins include ethylene, styrene, propylene, butene-1, isobutylene, 3-methylbutene-1, pentene-1, hexene-1, octene-1, decene-1, and the like, alone, or in admixture. Propylene is a presently preferred monomer. Also included are copolymers and terpolymers of ethylene and propylene and ethylene and butylene. In addition monoalkylarenes may be employed, for example, styrene or alkylstyrene.

Ziegler-Natta Catalysts

The Ziegler-Natta catalyst system comprises a catalyst formed by admixing a subhalide of a metal selected from the group of metals of Groups IVB, VB and VIB and an aluminum compound containing at least one carbon to metal bond. The metal subhalide can be, for example, titanium trichloride and the subhalides of vanadium, zirconium, thorium, etc., the preferred Group IVB metal is titanium trichloride and more specifically titanium trichloride cocrystallized with aluminum chloride according to the formula $n\text{TiCl}_3 \cdot \text{AlCl}_3$, where n is a number from 1 to 5. As activators for the titanium trichloride the aluminum compounds containing at least one carbon to metal bond are preferred. Examples of such compounds are trialkyl aluminums wherein the alkyl groups contain from 1 to 10 carbon atoms, but preferably aluminum triethyl or dialkyl aluminum monohalides, wherein the alkyl groups contain from 1 to 10 carbon atoms and the halide is chlorine. The amount of catalyst ranges from 0.01 to 10 weight percent of the liquid monomer or diluent in the prepolymerization zone. The mole ratio of aluminum to titanium ranges from 0.01:1 to 3:1, preferably from 0.05:1 to 0.5:1.

The organo-aluminum-$\text{TiCl}_3$ catalyst system can also be modified by addition of an electron donor (Lewis base) as a third component. Examples of such electron donors are phosphines, phosphine oxides, phosphites, phosphates, phosphoric amides, amines, amides, imides, lactams, heterocyclic compounds, ethers, ketones, aldehydes, esters, lactones, silicates, siloxanes, sulfides, thiols, thiophenols, thioesters, thiophosphites, etc. Also, any one of the recently developed high efficiency polypropylene catalysts can be used in the polymerization reaction.

The catalyst is typically added in solution form in the polymerization diluent.

The total quantity of catalyst required to effect polymerization can be determined readily by one skilled in the art and depends upon the particular conditions such as temperature, impurities, molecular weight desired and the like. Normally, the total quantity of catalyst expressed in gram millimoles of the organoaluminum halide per hundred grams of monomer varies in the range of from about 0.3 to 30; however, a more economical range of from about 0.5 to 10 has produced good results.

Polymerization can take place in a wide range of temperature. A convenient range in which effective polymerization can be obtained is 0° to 120° C., with good results obtained employing a range from about 30° to 80° C. Also the polymerization pressure varies widely. The polymerization reaction can be carried out under autogeneous pressure or at any suitable pressure sufficient to maintain the reaction mixture substantially in the liquid phase. Generally the pressure will thus depend upon the particular diluent being employed and the temperature at which the polymerization is carried out. However, higher pressures can be employed if desired by using a suitable method such as the pressurization of the reactor with a gas which is inert with respect to the polymerization reaction. Any of the known methods for removing such contaminants can be used. Therefore, wherever a diluent is employed in the process, it is preferred that the diluent be substantially free of impurities such as those listed above. In this connection it is desirable to remove the air and moisture from the reaction vessel in which the polymerization is conducted. Any of the known methods of removing such contaminants can be used. Therefore, wherever a diluent is employed in the process, it is preferred that the diluent be substantially free of impurities such as those listed above. In this connection it is desirable to remove the air and moisture from the reaction vessel in which the polymerization is conducted.

POLYMERIZATION DILUENTS

Polymerization is conducted by contacting the monomer charge with the Z-N catalyst system in an inert atmosphere in a suitable polymerization diluent. Suitable diluents include any of the paraffinic, cycloparaffinic, or aromatic hydrocarbons known to the art, used alone or in admixture, typically of 4 to 10 carbon atoms per molecule. Monomers used in the reaction may also be used as diluents.

Exemplary species include such as n-hexane, n-heptane, cyclohexane, cyclopentane, benzene, toluene, the xylenes, 2,2,4-trimethylpentane, and the like. Monomers include ethylene, propylene or 1-butene. N-heptane currently is preferred for ease of handling, high solubility of polymer, and availability.

Transmetallation

For the transmetallation step the transmetallation reagent or chain transfer agent is added to the reaction mixture before polymerization is initiated if maximum yield of block polymer is desired. Addition of the transfer agent after Z-N polymerization has begun will lend to the formation of a mixture of Z-N homopolymer and block copolymer. The transmetallation reagent can be of the formula $R_2M$, wherein R can be methyl, ethyl, propyl, octyl and the like or salts of these alkyls and M can be Zn, Cd or Pb. The transmetallation reagent can be present at the initiation of the Ziegler-Natta polymerization step or be added subsequently. The amount necessary will vary with reactants and conditions but will generally be in the range of from about 0.1 mole/mole of catalyst to about 100 mole/mole of catalyst. The transmetallation reagent can be added in solution form in the polymerization diluent.

The first stage or Z-N polymerization conditions are maintained for a length of time sufficient to allow the reaction to produce an optimal amount of product. The time may vary with reactants and conditions but will usually be in the range of from 15 minutes to 8 hours.

ANIONIC POLYMERIZATION STEP

Anionic Transfer Agents

Any of the hydrocarbon monolithium initiators known in the anionic solution polymerization art can be employed. Typically these can be represented by RLi or ROLi in which R is a hydrocarbon radical and can be aliphatic, cycloaliphatic, or aromatic, containing at least one carbon atom per molecule. The number of carbon atoms and consequently the molecular weight of the hydrocarbon monolithium initiator is not limited as far as operability is concerned, though those of up to about 20 carbon atoms are more readily available. Most frequently employed are the aliphatic monolithium types. Exemplary initiators include such as n-butyllithium, sec-butyllithium, t-butyllithium, n-decyllithium, pehnyllithium, 1-naphthyllithium, p-tolyllithium, cyclohexyllithium, eicosyllithium, lithium methoxide, lithium ethoxide, and the like, alone usually though mixtures are suitable.

The amount of transfer agent employed depends on the polymer molecular weight desired and thus varies widely. Typically, the amount of transfer agent is in the approximate range of 0.05 to 20 milliequivalents of lithium per 100 grams of total monomer. The transfer agent conveniently is employed as a solution in a hydrocarbon polymerization diluent.

Monomers

Any monomer suseptable to anionic solution polymerization may be used. Useful monomers include conjugated dienes, monoalkylarene, activated alphaolefins and the like. Conjugated dienes may include any of the conjugated dienes, preferably the hydrocarbon conjugated dienes known to polymerize with lithium initiators under anionic solution polymerization conditions. On an exemplary basis, these conjugated dienes contain 4 to 12 carbon atoms per molecule, preferably 4 to 8 carbon atoms per molecule, and preferably for industrial purposes those of 4 or 5 carbon atoms per molecule.

Examples of the conjugated dienes include the presently preferred 1,3-butadiene and isoprene, as well as 2,3-dimethyl-1,3-butadiene, 2-methyl-1,3-pentadiene, 2,3-dimethyl-1,3-pentadiene, 2-methyl-3-ethyl-1,3-pentadiene, 2-phenyl-1,3-butadiene, and the like, alone or in admixture with other conjugated dienes or other monomers.

The addition of conjugated diene forms the desired rubbery component of the copolymer. This polymerization usually uses additional polymerization hydrocarbon diluent so as to keep the reaction mixture viscosity low enough to be adequately stirred. The conjugated diene is preferably polymerized at a higher second polymerization temperature than at the lower first polymerization temperature used for alphaolefin type monomer polymerization since higher temperatures favor a desirably higher rate of conjugated diene polymerization and also further reduce the solution viscosity. A convenient range in which polymerization can be obtained is 0 to 150° C., preferably from about 50° C. to about 120° C. Polymerization pressure will vary as in the first step.

The amount of polymerization diluent to be added at this stage of polymerization, can vary widely. It is convenient to use the same polymerization diluent in each stage to avoid possible complexities in ultimate separation and recycle. Generally, sufficient polymerization diluent is added such that the ratio of total weight of diluent to total weight of all monomers added in all steps of the polymerization process is about 3:1 to 25:1, preferably about 5:1 to 10:1.

The polymerization time for formation of the poly(conjugated diene) normally is in the range of about 2 minutes to several hours, preferably 5 minutes to 30 minutes.

At the completion of the polymerization steps, the living polymers, polymers containing carbon-lithium moieties and thus capable of propagating further polymerization, are terminated. In the context of this specification, the term "termination" refers either to termination as such of the polymer-lithium by conventional noncoupling type of final termination by removal of the active lithium such as with water, acid, lower alcohol, or the like, which remove the lithium and substituting a hydrogen; or by reaction with a coupling agent. The term "coupling" as herein employed is a generic term meaning the bringing together and joining by means of a central coupling atom or coupling moiety two or more of the living lithium-terminated polymer chains so as to produce either a linear coupled product, or radially branched coupled product. Of course, it is recognized that a coupling agent is not necessarily 100 percent efficient, and that any coupling procedure usually results in some species remaining uncoupled, while in the case of a polyfunctional coupling agent containing three or more coupling entities, that some of the coupling moieties may result in a partially linear coupled faction as well as a substantial radially coupled faction in the coupled product.

A wide variety of compounds suitable for such purposes can be employed. Among the suitable coupling agents are the multivinylaromatic compounds, multiepoxides, multiisocyanates, multiimines, multialdehydes, multiketones, multianhydrides, multiesters which are the esters of polyalcohols with monocarboxylic acids, or esters of polyacids with monohydric alcohols, and the diesters which are esters of monohydric alcohols with dicarboxylic acids, monoesters of either type, ultihalides, carbon monoxide, carbon dioxide, and the like. Furthermore, compounds containing more than one type of functional group are useful as coupling agents.

Examples of suitable multivinylaromatic compounds include divinylbenzene, 1,2,4-trivinylbenzene, 1,3-divinylnaphthalene, 1,8-divinylnaphthalene, 1,3,5-trivinylnaphthalene, 2,4-divinylbiphenyl, and the like. The divinylaromatic hydrocarbons are preferred, particularly divinylbenzene in either its orth, meta, or para isomer. Commercial divinylbenzene which is a mixture of the three isomers and other compounds is quite satisfactory.

While any multipoxide can be used, preferred are those which are liquid since they are more readily handled and form a relatively small nucleus for the radial polymer. Especially preferred among the multiepoxides are the epoxidized hydrocarbon polymers such as epoxidized liquid polybutadiene and the epoxidized vegetable oils such as epoxidized soybean oil and epoxidized linseed oil. Other epoxy compounds such as 1,2; 5,6; 9,10-triepoxydecane, and the like, also can be used.

Examples of suitable multiisocyanates include benzene-1,2,-4-triisocyanate, naphthalene-1,2,5,7-tetraisocyanate, and the like. Especially suitable is a commercially available product known as PAPI-1, a polyarylpolyisocyanate having an average of three isocyanate groups per molecule and an average molecular weight of about 380. Such a compound can be visualized as a series of isocyanate-substituted benezene rings joined through methylene linkages.

The multiimines, which are also known as multiaziridnyl compounds, preferably are those containing 3 or more aziridine rings per molecule. Examples of such compounds include the triaziridinyl phosphine oxides or sulfides such as tri(1-aziridinyl)phosphine oxide, tri(2-methyl-1-aziridinyl)phosphine oxides, tri(2-ethyl-3-decyl-1-azridinyl)phosphine sulfide, and the like.

The multialdehydes are represented by compounds such as 1,4,7-naphthalene tricarboxyaldehyde, 1.7,9-anthracene tricarboxy-aldehyde, 1,1,5-pentane tricarboxyaldehyde, and similar multialdehyde-containing aliphatic and aromatic compounds.

The multiketones can be represented by compounds such as 1,4,9,10-anthracenetetrone, 2,3-diacetonylcyclohexanone, and the like.

Examples of the multianhydrides include pyromellitic dianhydride, styrene-maleic anhydride copolymers, and the like.

Examples of the di- and multiesters include diethyl adipate, triethyl citrate, 1,3,5-tricarbethoxybenzene, and the like.

Among the multihalides, presently preferred are the silicon tetrahalides such as silicon tetrachloride, silicon tetrabromide, and silicon tetraiodide; and the trihalohydrocarbylsilanes such as trifluorophenysilane, trichloroethylsilane, tribromobenzylsilane, and the like. Also preferred are the multihalogen-substituted hydrocarbons, such as 1,3,5-tri(bromomethyl)benzene, 2,5,6,9-tetrachloro-3,7-decadiene, and the like, in which the halogen is attached to a carbon atom which is alpha to an activating group such as an ether linkage, a carbonyl group, or carbon-to-carbon double bond. Substituents inert with respect to lithium atoms in the terminally reactive polymer can also be present in the active halogen-containing compounds. Alternatively, other suitable reactive groups different from the halogen as described above can be present.

Examples of compounds containing more than one type of functional group include 1,3-dichloro-2-propanone, 2,2-dibromo-3-decanone, 3,5,5-trifluoro-4-octanone, 2,4-dibromo-3-pentanone, 1,2; 4,5-diepoxy-3-pentanone, 1,2; 4,5-diepoxy-3-hexanone, 1,2; 11,12-diepoxy-8-pentadecanone, 1,2; 18,19-diepoxy-7,14-eicosanedione, and the like.

In addition to the silicon multihalides as described hereinabove, other metal multihalides, particularly those of tin, lead, or germanium, also can be readily employed as coupling and branching agents.

Difunctional counterparts of these agents also can be employed, whereby a linear polymer rather than a branched polymer results.

For the purpose of coupling, one equivalent of coupling agent per equivalent of lithium is considered an optimum amount for maximum branching. Any range of treating agent can be employed, depending on the degree of coupling desired. Broadly, about 0.5 to 1.5 equivalents per equivalent of lithium usually is used.

The coupling agent can be added neat, or alternately added in an inert hydrocarbon solution, such as in cyclohexane. The coupling agent can be added in one batch, or alternately may be added incrementally or continuously. The coupling reaction normally is conducted at the same temperature as employed in the third polymerization step, this being broadly about 0° C. to 140° C., preferably about 50° C. to 120° C. The time for the coupling reaction can range from a few minutes to several hours, preferably from 1 minute to 30 minutes. The polymerization solution with the added coupling agents are agitated for the duration of the coupling reaction.

POLYMER RECOVERY

After the completion of the terminating or coupling reaction, the polymer can be recovered by methods well known in the art. In one suitable method water or alcohol is added to the mixture to precipitate the polymer. The polymer then is separated from the alcohol or water and diluent by any suitable means such as decantation or filtration. It has also been found advantageous to add an antioxidant, such as 2,6-di-t-butyl-4-methylphenol, to the polymer mixture prior to precipitation of the polymer. It is, of course, to be realized that it is within the scope of the invention to employ other suitable means to recover the polymer from solution such as, for example, steam stripping. After separation from the solvent mixture and alcohol or water by filtration or other suitable means, the polymer is dried.

Polymers can be compounded by methods as known in the art. Compounding ingredients, such as fillers, dyes, pigments, curing or crosslinking agents, softeners, reinforcing agents, and the like, can be used in the compounding operation. In manufacturing finished articles, the polymer can be molded or extruded.

EXAMPLES

Prepurified propylene and 1-butene were obtained and used without further purification.

Prepurified butadiene and isoprene were further purified by distillation through a bed of $Al_2O_3$.

$AlEt_3$(25% in hexane, 95% pure, Lot No. 121377), $ZnEt_2$ (25% in hexane, 98% pure,) and n-BuLi (22% in hexane) were used as received from Alfa Products. $InEt_3$ was purchased from Organometallics, Inc. $TiCl_3$ was from Stauffer Chemical Company. Reagent grade heptane was purchased from Mallinckrodt and dried over 4-A Molecular Sieves.

The polymerization was performed in a 4 l glass impellor stirred constant temperature reaction vessel.

Other modifications and variations of the present invention are possible in light of the above teachings. It is therefore to be understood that changes may be made and particular embodiments described which are within the full intended scope of the invention as defined in the appended claimed.

The process of the present invention was applied to the preparation of a polybutylene (PB)-polystyrene (PS) diblock polymer (PB-PS). Polymerization of 1-butene ($C_4$=) was accomplished by the sequential addition of $TiCl_3$ (0.31g, 2.0 mmol), $Et_3Al$ (1.46g of a 25% solution in heptane, 3.2 mmol) and $Et_2Zn$ (3.3g of a 25% solution in heptane, 6.7 mmol) to 100 g of monomer (1.7 mol) in 1.5 of heptane. Reaction for 3 hr at 70° C. consumed most of the $C_4$=; an aliquot (~100 ml) of the solution was isolated, concentrated, and the polymer (6.8g) analyzed ($M_N$=33,000, Q=9.6 $T_M$=107° C., hot acetone soluble (by soxlet extraction) 11% wt. The polybutylene homopolymer was typical of a $TiCl_3$-/TEA product.

The remainder of the solution was treated with 46 mmol of freshly prepared LiOMe (from the reaction of 23 ml of 2 M n-BuLi in heptane (46 mmol) with 1.5g of MeOH (47 mmol)), two equivalents of transmetallation agent for each equivalent of metal alkyl in the system. Styrene monomer was added and polymerization conditions were maintained at 25° C. for 18 hr.

The resulting solution yielded 110 g of polymer (55% theory). Analysis by infrared spectroscopy clearly showed the presence of polymerized styrene. Soxhlet extraction (hot acetone) of the copolymer product formed showed 26%w to be soluble; approximately 11% being soluble PB homopolymer and 15% a styrene rich polymer. The extraction experiments showed the product to be the desired PB-PS diblock copolymer.

This was arrived at as follows: Extraction of the hot polymer should remove the styrene homopolymer which was present. Since most of the PS resisted extraction, styrene content dropped from 48% w to 41% w after extraction, only a small portion would have been homopolystyrene. The remaining PS must have been resistant to extraction as a result of being chemically bound to polybutylene: only the desired diblock, PB/PS copolymer could afford a solvent resistant form of styrene polymer.

Micro test specimens cut from thin films of the diblock and homopolymers synthesized in the experiment were used in measuring the tensile properties of the products. For comparison purposes, test samples were also prepared from a PB homopolymer/PS homopolymer blend (50% PS($M_N$=10,000). The data from these experiments are summarized in the Table. The starting PB polymer for the diblock synthesis as well as that for the blend study were both typical soft PB materials—low modulus (E), low tensile strength ($\sigma_B$), high elongation at break ($\epsilon_B$). The consequences of attaching a PS chain to the end of the PB moieties was to make the materials much harder ($E_{Diblock}$=27,700 psi vs $E_{Homopolymer}$=7,000); this effect was more pronounced for the diblock than for the blend which had no attached PS.

The presence of the PS appeared to reduce the strength of the material. The measured tensile strength at break for the diblock was only 660 psi ($\sigma_B$(homopolymer)=1145); as the sample failed at only 10% elongation, the actual strength of the material may be considerably higher. When pulling test specimens at fast rates (10 in/min in this case), the tensile technique tends to underestimate the strengths of very brittle specimens. The blend specimen showed a catastrophic loss in strenght—$\sigma_B$=210 psi vs 1855 for PB homopolymer. As expected, having the PS chemically bound to the PB gives a stronger material than having it present as an unadhered second phase.

Another consequence of having the elastomeric PB attached to the brittle PS dispersed phase was a complete loss in elasticity ($\epsilon_B$(diblock)=10% vs $\epsilon_B$(homopolymer)=396%). In the blend material, the effect of the presence of the styrene phase on $\epsilon_B$ was not as pronounced. Since the continuous PB phase was not attached to the PS domains, it could deform without mechanical failure.

TABLE

|  | E (PSI) | $\sigma_y$ (PSI) | 100% MOD (PSI) | 200% MOD (PSI) | 300% MOD (PSI) | $\sigma_B$ (PSI) | $\epsilon_B$ (PSI) |
|---|---|---|---|---|---|---|---|
| PB Homopolymer | 7,000 | 545 | 745 | 885 | 1195 | 1145 | 396 |
| PB/PS Diblock Control Blend | 27,700 | 650 | — | — | — | 660 | 10 |
| PB Homopolymer | 2,500 | 270 | 400 | 585 | 835 | 1855 | 590 |
| PB/PS Blend | 5,640 | 185 | 200 | — | — | 210 | 155 |

What is claimed is:

1. A process for preparing living multi-block copolymers comprising;
   (a) combining under polymerization conditions one or more alpha olefin monomers in a suitable diluent in the presence of a Ziegler-Natta catalyst system and a transmetallation reagent selected from the group consisting of dialkyl zinc, dialkyl cadmium, tetralkyl lead, and their salts,
   (b) contacting the resulting polymer with an anionic transfer reagent generating an anionic polymerization initiator thereby forming living polymer chains,
   (c) contacting the resulting living polymer chains sequentially with one or more monomers selected from the group consisting of conjugated dienes, and monoalkenylarenes and activated mono olefins;
   (d) recovering multi-block copolymers.

2. A process for preparing block copolymers comprising:
   (a) combining under polymerization conditions one or more alpha-olefin, monomers, a Ziegler-Natta catalyst, a transmetallation reagent in a suitable diluent;
   (b) contacting the resulting polymer with an anionic polymerization transfer reagent selected from the group consisting of MeOLi, EtOLi, PrOLi, BuOLi, hexyl and octyl alkoxides of lithium, thereby forming living polymer chains;
   (c) contacting the resulting living polymer chains sequentially with one or more monomers selected from the groups consisting conjugated dienes monoalkenylarenes and activated monoolefins thereby forming living multi block copolymers;
   (d) contacting the resulting living multi block copolymers with a coupling agent having a functionality of two or more; and
   (e) recovering the resulting block copolymer.

3. The process according to claim 1 wherein said alpha-olefin monomer is ethylene, propylene, 1-butene or a mixture.

4. The process according to claim 1 wherein said hydrocarbon diluent is n-hexane, n-heptane, cyclohexane, cyclopentane, benzene, toluene, one or more xylenes, 2,2,4-trimethylpentane, or mixture, or monomers themselves.

5. The process of claim 1 wherein the Ziegler-Natta catalyst is an organo-aluminum/TiCl$_3$ catlayst.

6. The process of claim 1 wherein the Ziegler-Natta catalyst is triethylaluminum/TiCl$_3$.

7. The process of claim 1 wherein the Ziegler-Natta catalyst is diethylaluminum chloride/TiCl$_3$.

8. The process of claim 1 wherein the Ziegler-Natta catalyst is present at between 0.3 and 30 millimoles per hundred grams of monomer.

9. The process of claim 1 wherein the transmetallation reagent is diethyl zinc.

10. The process of claim 1 wherein the Ziegler-Natta polymerization takes place at a temperature between about 30° C. and about 80° C., a pressure sufficient to maintain the mixture substantially liquid and continues for between 15 minutes and 8 hours.

11. The process according to claim 1 wherein said transfer agent is n-butyllithium, sec-butyllithium, n-decyllithium, phenyllithium, 1-naphthyllithium, p-tolyllithium, cyclohexllithium, eicosyllithium or their alkoxides or mixture.

12. The process according to claim 1 wherein said conjugated diene is 1,3-butadiene, isoprene, 2,3-dimethyl-1,3-butadiene, 2-methyl-1,3-pentadiene, 2,3-dimethyl-1,3-pentadiene, 2-methyl-3-ethyl-1,3-pentadiene, 2-methyl-1,3-butadiene or mixture.

13. The process of claim 1 wherein the monoalkylarene is styrene or alkylstyrene.

14. The process of claim 1 wherein the anionic polymerization takes place at between 20° C. and 120° C. for between 2 minutes and 8 hours.

15. The process according to claim 1 wherein said polymerization admixture, after polymerization of said conjugated diene monomer is treated with a lower alcohol, acid, or water.

16. The process according to claim 2 wherein said alpha-olefin monomer is ethylene, propylene, 1-butene or a mixture.

17. The process according to claim 2 wherein said hydrocarbon diluent is n-hexane, n-heptane, cyclohexane, cyclopentane, benzene, toluene, one or more xylenes, 2,2,4-trimethylpentane, or mixture or monomer.

18. The process of claim 2 wherein the Ziegler-Natta catalyst is an organo-aluminum/TiCl$_3$ catlayst.

19. The process of claim 2 wherein the Ziegler-Natta catalyst is triethylaluminum/TiCl$_3$.

20. The process according to claim 2 wherein said hydrocarbon diluent is Et$_2$AlCl/TiCl$_3$.

21. The process of claim 2 wherein the Ziegler-Natta catalyst is present at between 0.3 and 30 millimoles per hundred grams of monomer.

22. The process of claim 2 wherein the transmetallation reagent is diethyl zinc.

23. The process of claim 2 wherein the Ziegler-Natta polymerization takes place at a temperature between about 30° C. and about 80° C., a pressure sufficient to maintain the mixture substantially slurry and continues for between 15 minutes and 8 hours.

24. The process according to claim 2 wherein said initiator is n-butyllithium, sec-butyllithium, n-decyllithium, phenyllithium, 1-naphthyllithium, p-tolyllithium, cyclohexllithium, eicosyllithium or their alkoxides or mixture.

25. The process according to claim 2 wherein said conjugated diene is 1,3-butadiene, isopresne, 2,3-dimethyl-1,3-butadiene, 2-methyl-1,3-pentadiene, 2,3-dimethyl-1,3-pentadiene, 2-methyl-3-ethyl-1,3-pentadiene, 2-methyl-1,3-butadiene or mixture.

26. The process of claim 2 wherein the monoalkylarene is styrene or alklystyrene.

27. The process of claim 2 wherein the anionic polymerization takes place at between 30° C. and 120° C. for between 2 minutes and 8 hours.

28. The process according to claim 2 wherein said coupling agent is present in the range of about 0.5 to 10 equivalents per equivalent of lithium, thereby preparing a coupled polymer.

29. The process according to claim 2 wherein said coupling agent is a polyepoxide, polyisocyanate, polyamine, polyaldehyde, polyketone, polyanhydride, polyester, polyhalide, polyvinyl aromatic, carbon dioxide, or monoester, wherein the functionality of said agent is at least 2.

30. The process according to claim 2 employing 1-butene as said alpha-olefin monomer, heptane as said diluent, n-butyllithium as said hydrocarbon monolithium initiator, 1,3-butadiene as said conjugated diene; and wherein coupling is by treatment with silicon tetrahalide.

31. The process according to claim 2 employing silicon tetrachloride as said silicon tetrahalide.

32. The block copolymer product produced by the process of claim 1.

33. The block copolymer product produced by the process of claim 2.

34. The end-capped block copolymer product produced by the process of claim 1.